(12) United States Patent
Kishi et al.

(10) Patent No.: US 9,633,049 B2
(45) Date of Patent: Apr. 25, 2017

(54) SEARCHING APPARATUS, SEARCHING METHOD, AND SEARCHING SYSTEM

(71) Applicants: Hidenobu Kishi, Kanagawa (JP); Takayuki Kunieda, Tokyo (JP); Tetsuya Ikeda, Tokyo (JP)

(72) Inventors: Hidenobu Kishi, Kanagawa (JP); Takayuki Kunieda, Tokyo (JP); Tetsuya Ikeda, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 104 days.

(21) Appl. No.: 13/910,276

(22) Filed: Jun. 5, 2013

(65) Prior Publication Data

US 2014/0006435 A1    Jan. 2, 2014

(30) Foreign Application Priority Data

Jun. 29, 2012 (JP) ................................. 2012-148043

(51) Int. Cl.
G06F 7/00 (2006.01)
G06F 17/30 (2006.01)

(52) U.S. Cl.
CPC .............................. *G06F 17/30277* (2013.01)

(58) Field of Classification Search
CPC ......... G06F 17/30864; G06F 17/30067; G06F 17/30867; G06Q 10/10; G06Q 30/02
USPC ....................................................... 707/758
See application file for complete search history.

(56) References Cited

U.S. PATENT DOCUMENTS

| 6,181,818 | B1 * | 1/2001 | Sato .................. G06F 17/30256 |
| | | | 382/170 |
| 7,620,622 | B1 * | 11/2009 | Larsson ............ G06F 17/30943 |
| 8,577,153 | B2 * | 11/2013 | Duan et al. .................... 382/195 |
| 8,938,441 | B2 * | 1/2015 | Liao .................. G06F 17/30864 |
| | | | 707/709 |

(Continued)

FOREIGN PATENT DOCUMENTS

| JP | 2003-316937 A | 11/2003 |
| JP | 2004-086489 | 3/2004 |

(Continued)

OTHER PUBLICATIONS

Japanese Office Action mailed Apr. 26, 2016 for JP Application No. 2012-148043.

*Primary Examiner* — Robert Beausoliel, Jr.
*Assistant Examiner* — Michael Pham
(74) *Attorney, Agent, or Firm* — Harness, Dickey & Pierce, P.L.C.

(57) ABSTRACT

A searching apparatus comprising: a storage unit that stores therein indexes for searching for an object included in an image and cooperative information indicating a function of cooperating with the object in association with each other; a receiving unit that receives a captured image; an extracting unit that extracts an object included in the captured image; a calculating unit that calculates a degree of similarity between the object searched for by an index stored in the storage unit and the object extracted from the captured image by the extracting unit; a searching unit that searches for one or more objects based on the degree of similarity from the storage unit; and a presenting unit that presents the cooperative information associated with the index corresponding to the object as a search result of the searching unit to a source of the captured image.

16 Claims, 6 Drawing Sheets

(56) References Cited

U.S. PATENT DOCUMENTS

| | | | | |
|---|---|---|---|---|
| 2005/0238214 A1* | 10/2005 | Matsuda | ............ | G06K 9/00885 |
| | | | | 382/124 |
| 2008/0304753 A1* | 12/2008 | Sohma | .............. | G06F 17/30256 |
| | | | | 382/218 |
| 2009/0276418 A1* | 11/2009 | Horibe | .............. | G06F 17/30675 |
| 2010/0003778 A1 | 1/2010 | Tada et al. | | |
| 2010/0076867 A1* | 3/2010 | Inoue | ................ | G06F 17/30256 |
| | | | | 705/26.1 |
| 2012/0269429 A1* | 10/2012 | Lee | ...................... | G06K 9/4652 |
| | | | | 382/165 |
| 2013/0251266 A1* | 9/2013 | Nakagome | ......... | G06K 9/00657 |
| | | | | 382/195 |
| 2014/0006387 A1* | 1/2014 | Kishi | ................ | G06F 17/30879 |
| | | | | 707/722 |

FOREIGN PATENT DOCUMENTS

| JP | 2009-506393 | 2/2009 |
|---|---|---|
| JP | 2010/016281 A | 1/2010 |
| WO | WO 2007/023992 A1 | 3/2007 |

* cited by examiner

| ID | INDEX DATA |
|---|---|
| aaa001 | (BINARY DATA) |
|  |  |
|  |  |

(120)

(b)

| ID | OBJECT AREA |
|---|---|
| aaa001 | (XML CODE/XML FILE NAME) |
|  |  |
|  |  |

<hotspot>
    <area>x1,y1,x2,y2</area>
    <link>
          <title>****Shop Web Page</title>
          <type>info</type>
          <URI>http://1.example.org/index.html</URI>
    </link>
    <link>
      :
    </link>
  </hotspot>
  <hotspot>
    :
  </hotspot>

SEARCHING APPARATUS, SEARCHING METHOD, AND SEARCHING SYSTEM

CROSS-REFERENCE TO RELATED APPLICATIONS

The present application claims priority to and incorporates by reference the entire contents of Japanese Patent Application No. 2012-148043 filed in Japan on Jun. 29, 2012.

BACKGROUND OF THE INVENTION

1. Field of the Invention

The present invention relates to a searching apparatus, a searching method, and a searching system for searching for information using images.

2. Description of the Related Art

A technique is already known in which objects and pieces of cooperative information that cooperate with objects are stored in a server or the like in association with each other, and an object corresponding to an object included in an image captured by a user is searched for in the server (see Japanese National Publication of International Patent Application No. 2009-506393). A technique that presents cooperative information associated with an object searched for to a user is also already known.

In some cases, the server stores therein a second object that is very similar to a first object included in an image captured by a user and with which cooperative information different from that of the object is associated. In such a case, as a result of a search based on an image including the captured first object, this second object can be searched for and hence cooperative information expected by the user cannot be obtained.

For example, there may be a case in which with second objects being thumbnail images formed by reducing the first objects, the first objects are associated with unique cooperative information, while a list of the respective second objects that are based on the respective different first objects is associated with the second objects as cooperative information. In such a case, because the second object is formed by reducing the first object, the second object may be searched for as a result of a search based on an image including the first object.

The present invention has been achieved in view of the above circumstances, and an object thereof is to attain a more appropriate search result by an image-based search.

SUMMARY OF THE INVENTION

It is an object of the present invention to at least partially solve the problems in the conventional technology.

According to the present invention, there is provided: a searching apparatus comprising: a storage unit configured to store therein indexes for searching for an object included in an image and cooperative information indicating a function of cooperating with the object in association with each other; a receiving unit configured to receive a captured image; an extracting unit configured to extract an object included in the captured image; a calculating unit configured to calculate a degree of similarity between the object searched for by an index stored in the storage unit and the object extracted from the captured image by the extracting unit; a searching unit configured to search for one or more objects based on the degree of similarity from the storage unit; and a presenting unit configured to present the cooperative information associated with the index corresponding to the object as a search result of the searching unit to a source of the captured image.

The invention also provides A searching method comprising: receiving a captured image; extracting an object included in the captured image; calculating a degree of similarity between an object searched for by an index stored in a storage unit that stores the index for searching for an object included in the captured image and cooperative information indicating a function that cooperates with the object in association with each other; searching one or more objects based on the degree of similarity from the images stored in the storage unit; and presenting the cooperative information associated with the index corresponding to the object as a search result of the searching unit to a source of the captured image.

The invention also provides a searching system including a network, a searching apparatus that connects to the network, and a terminal unit that connects to the network and transmits a captured image to the searching apparatus through the network, the searching apparatus includes an information processing unit and a storage unit configured to store therein indexes for searching for an object included in an image and cooperative information indicating a function of cooperating with the object in association with each other.

In the above-mentioned searching system, the information processing unit comprises; a receiving unit configured to receive the captured image, an extracting unit configured to extract an object included in the captured image, a calculating unit configured to calculate a degree of similarity between the object searched for by an index stored in the storage unit and the object extracted from the captured image by the extracting unit, a searching unit configured to search for one or more objects based on the degree of similarity from the storage unit, and a presenting unit configured to present the cooperative information associated with the index corresponding to the object as a search result of the searching unit to the terminal unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
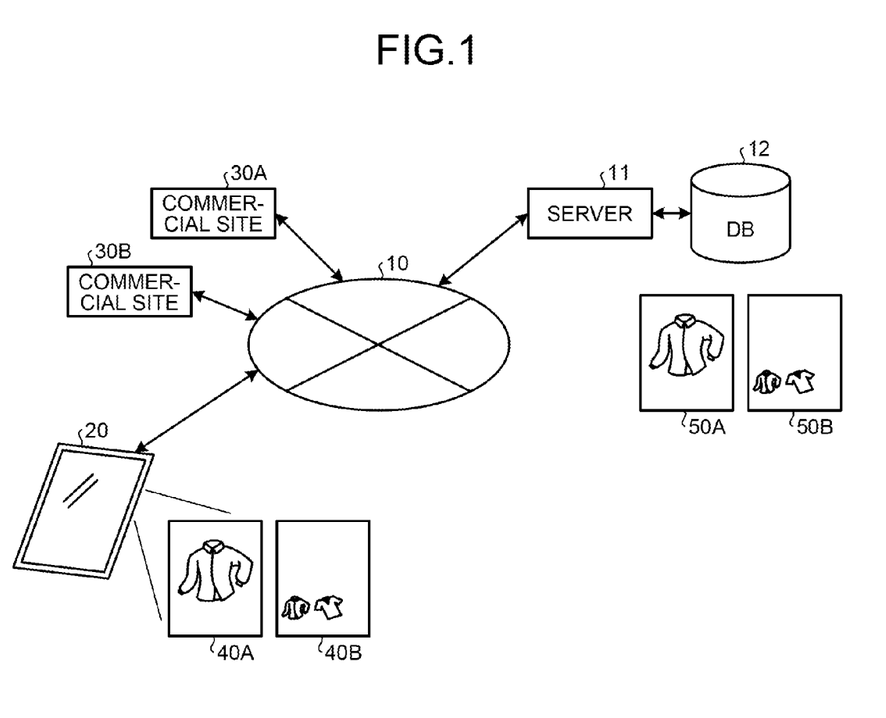
FIG. 1 is a diagram illustrating an exemplary configuration of a searching system according to an embodiment of the present invention.

Hereinafter, embodiments of a searching system, a searching apparatus, and a searching method will be described in detail with reference to the accompanying drawings. FIG. 1 is a diagram illustrating an exemplary configuration of a searching system according to an embodiment.

A server 11 and a terminal unit 20 are connected to a network 10. The network 10 is, for example, the Internet, and the Transmission Control Protocol/Internet Protocol (TCP/IP) is applied as its communication protocol. The network 10 may be a network cloud as a network group that includes a plurality of computers connected through a network and exposes only its input and output to the outside with its inside concealed as a black box.

A plurality of commercial sites 30A and 30B are also connected to the network 10. These commercial sites 30A and 30B can, for example, ship merchandise in response to orders made through the network 10.

The terminal unit 20 can perform communications with the network 10 by air or by cable. The terminal unit 20 can perform operations in accordance with orders received through the network 10, display images or the like received through the network 10 on a user interface (UI) including a display device and an input device, and transmit data to the network 10 in accordance with user operations made on the UI.

The terminal unit 20 has an image capture function and is configured to capture an image of a subject in accordance with an image capture operation onto the UI. The terminal unit 20 can transmit a captured image obtained by image capture to the network 10.

The server 11, to which a database (DB) 12 is connected, can perform search processing according to the embodiment on the DB 12 in accordance with requests received through the network 10. In the embodiment, the DB 12 stores therein each piece of index data for searching for a plurality of pieces of image data 50A and 50B in association with cooperative information. The index data is data obtained by analyzing the binary of the image, or data obtained by converting the image data into a structure for searching.

The image data may be directly stored in the DB 12. The file name and path of the image data may be stored in the DB 12.

The server 11 receives the image data through the network 10, searches the DB 12 based on the received image data, and retrieves cooperative information corresponding to the image data as a search result. The server 11 returns the cooperative information retrieved as the search result to the source of the image data.

FIGS. 2(a) and 2(b) illustrate examples of image data 50A and 50B from which index data is derived to be stored in the DB 12. An object included in image data is now defined. The object is defined as the image of a main object within an image represented by image data and is distinguished from the background image of the main object and the accompanying information of the main object within the image.

For example, the image data 50A and 50B are a contents page as the contents of a catalog magazine and a front cover page as the front cover of the catalog magazine, respectively. FIG. 2(a) illustrates an example of the image data 50A representing an image 130A of the contents page, whereas FIG. 2(b) illustrates an example of the image data 50B representing an image 130B of the front cover page.

FIG. 2(a) illustrates an example in which one object 131 is placed at the central part of the image 130A. In the image 130A, an object area 134 including the object 131 is set with respect to the object 131. FIG. 2(a) illustrates an example for a case in which the ratio of the size of the object 131 with respect to the size of the object area 134 is small. In the case of a catalog magazine, because the contents page aims at introducing items, the object 131 as an image indicating an item is displayed largely with respect to the contents page.

FIG. 2(b) illustrates an example in which a plurality of objects 132 and 133 are placed in the image 130B. The object 132 is a reduced image of the object 131 illustrated in FIG. 2(a), and the object 133 is another image. Still more objects may be placed in the image 130B. In this example, in the displayed page, the objects 132 and 133 included in the contents page are reduced in size to be displayed as thumbnails so that the contents of the catalog magazine are shown in a summarized manner. In the image 130B, an object area 135 is set so that it includes the objects 132 and 133 and covers the entire displayed page (the image 130B).

The object areas 134 and 135 are used as indicators for recognizing the object 131, and the objects 132 and 133, respectively. Each of the object areas can be set to be any size that includes the entire object and is smaller than the entire image including the object.

The cooperative information will be described. The cooperative information is, for example, information indicating a function that cooperates with an object included in an image, and more specifically, is information that includes an access method for accessing the attribute information of the object. The cooperative information may be, in practice, stored in the DB 12 in association with the object included in the image.

As an example, for the object 131 included in the image 130A of the contents page, the cooperative information is the uniform resource locator (URL) of the commercial site 30A that deals in the item indicated by the object 131 or the URL of a purchase site for performing purchase setting for the item. Without being limited thereto, the telephone number or e-mail address of a shop that deals in the item may be used as the cooperative information. Information for downloading a data file including the information of the item or the like may be used as the cooperative information. In the DB 12, a plurality of pieces of cooperative information may be associated with one object.

For example, the URL of a site on the network 10 that introduces the catalog magazine itself including the front cover page or the like may be used as the cooperative information for the objects 132 and 133 included in the image 130B of the front cover page.

Figure 3:
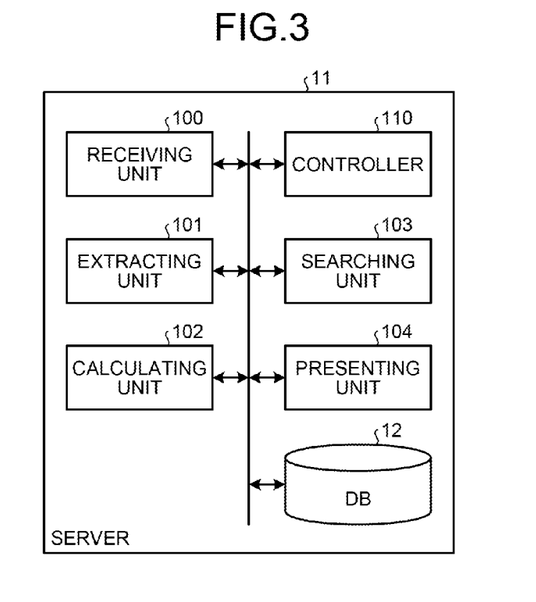
FIG. 3 is an exemplary functional block diagram illustrating the functions of a server according to the embodiment.

FIG. 3 is an exemplary functional block diagram illustrating the functions of the server 11. The server 11 includes a receiving unit 100, an extracting unit 101, a calculating unit 102, a searching unit 103, a presenting unit 104, and a controller 110. FIG. 3 illustrates that the DB 12 is included in the server 11. The controller 110 controls the entire operation of the server 11.

The receiving unit 100 receives image data transmitted through the network 10. For example, the receiving unit 100 receives a captured image (assumed to be the captured image 40A) transmitted from the terminal unit 20.

The extracting unit 101 performs image analysis on the captured image 40A received by the receiving unit 100, detects characteristic points in the captured image 40A, and extracts an object included in the captured image 40A. For example, the extracting unit 101 performs binarization on the captured image 40A, performs edge detection and normalization processing on the binarized image, and detects the characteristic points of the captured image 40A. The object is represented by the detected characteristic points.

The calculating unit 102 compares the characteristic points of a captured image 40A extracted by the extracting unit 101 with characteristic points that represent objects searched for by indexes stored in the DB 12. Based on the comparison result, the calculating unit 102 calculates the degree of similarity between the object included in the captured image 40A and the object searched for by the indexes stored in the DB 12. The degree of similarity can be determined by, for example, comparing the relation between pairs of characteristic points extracted from images. As an example, the relation between pairs of characteristic points is quantified to calculate a characteristic quantity, and the absolute value of the difference of the characteristic quantity is determined between images. When the determined absolute value of the difference is small, the similarity between the images is regarded to be high.

Based on the degree of similarity calculated by the calculating unit 102, the searching unit 103 searches for an image having a high degree of similarity with the object included in the captured image 40A from among the objects searched for by the indexes stored in the DB 12. The searching unit 103 outputs one index including an object having the highest degree of similarity with the object included in the captured image 40A from among the objects searched for by the indexes stored in the DB 12 as a search result.

Without being limited thereto, the searching unit 103 may output, from among the objects searched for by the indexes stored in the DB 12, a predetermined number of indexes in the order of including an object having a high degree of similarity with the object included in the captured image 40A as a search result or may output one or more indexes for searching for an object whose degree of similarity is not less than a threshold as a search result. The searching unit 103 may output an index whose degree of similarity is within a predetermined range (5% or the like) of the maximum value of the degree of similarity calculated for the captured image 40A as a search result.

The presenting unit 104 retrieves the cooperative information associated with the index as a search result by the searching unit 103 from the DB 12 and presents it to the terminal unit 20. This presentation of the cooperative information may be performed by directly transmitting the cooperative information to the terminal unit 20 or may be based on a method that generates a web page including the cooperative information and presents an access method to the web page (URL or the like) to the terminal unit 20. By accessing the web page from the terminal unit 20, the cooperative information can be acquired.

Without being limited thereto, the presented cooperative information may be acquired using application software (hereinafter referred to as an application for short) for performing a series of operations from the capture of the captured image 40A to the display of the presented cooperative information, the application being installed in the terminal unit 20 in advance.

The server 11 may be configured with a general computer apparatus including a central processing unit (CPU), a random access memory (RAM), a read only memory (ROM), and a storage device such as a hard disk drive. The server 11 is not limited to configuration with a single computer apparatus and may be configured so that, for example, it operates on a plurality of computer apparatuses in a distributed manner.

The above receiving unit 100, extracting unit 101, calculating unit 102, searching unit 103, presenting unit 104, and controller 110 are achieved by a searching program that operates on the CPU. Without being limited thereto, a part of or the whole of the receiving unit 100, the extracting unit 101, the calculating unit 102, the searching unit 103, the presenting unit 104, and the controller 110 may be achieved by separated pieces of hardware that cooperate with each other. A searching program for executing searching processing according to the embodiment is recorded and provided on a computer-readable recording medium such as a CD or a DVD as a file in an installable or executable format.

The searching program for executing searching processing according to the embodiment may be stored in a computer connected to a communications network such as the Internet and is provided by being downloaded through the communications network. The searching program for executing searching processing according to the embodiment may be provided or distributed through a communications network such as the Internet.

The searching program for executing searching processing according to the embodiment has, for example, a module structure including the above units (the receiving unit 100, the extracting unit 101, the calculating unit 102, the searching unit 103, the presenting unit 104, and the controller 110). As actual hardware, the CPU reads the searching program from, for example, the storage device and executes it, thereby loading the above units into a main storage (for example, the RAM) and generating the units on the main storage.

In such a configuration, for example, a user captures an image of a page of the catalog magazine using the terminal unit 20 to obtain the captured image 40A and a captured image 40B. In this example, the captured images 40A and 40B are captured images of the contents page and the front cover page of the catalog magazine, respectively. The user transmits, for example, the captured image 40A to the server 11 through the network 10.

The receiving unit 100 of the server 11 receives the captured image 40A and its characteristic points are detected by the extracting unit 101, thereby extracting the object. Based on the characteristic points detected by the extracting unit 101, the calculating unit 102 calculates the degree of similarity between the object included in the captured image 40A and the objects searched for by the indexes stored in the DB 12. The searching unit 103 searches for the index based on the calculation result. The presenting unit 104 retrieves the cooperative information from the DB 12 based on the search output by the searching unit 103 and presents it to the terminal unit 20, which is the source of the captured image 40A.

Based on the cooperative information presented by the server 11 to the terminal unit 20, the user, for example, accesses the commercial site 30A to purchase the item indicated by the object included in the captured image 40A.

Figure 2:
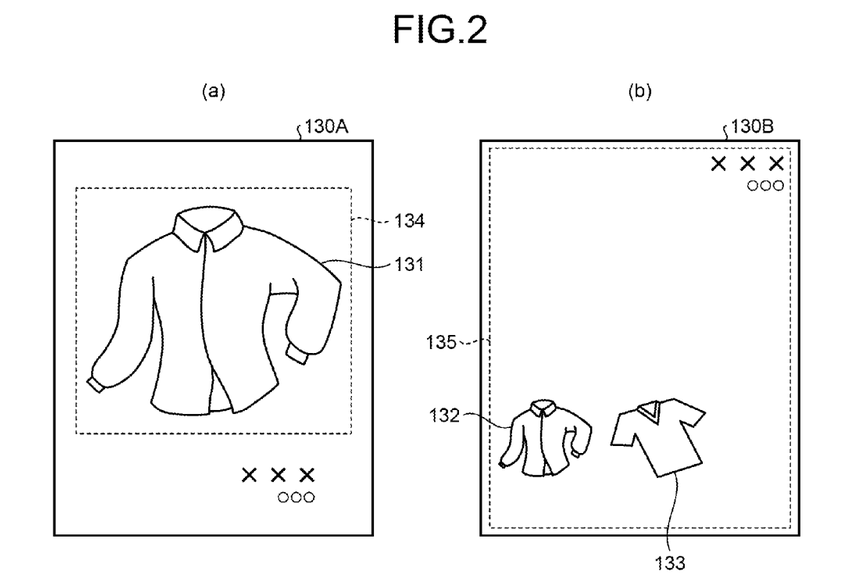
FIGS. 2(a) and 2(b) are diagrams illustrating examples of image data from which index data is derived to be stored in a DB according to the embodiment.

It is assumed that the terminal unit 20 captures an image including an object that is very similar to the object 131 included in the image 130A shown in FIG. 2(*a*) as the captured image 40A. It is also assumed that the DB 12 stores therein the image 130A including the object 131 and the image 130B including the object 132 obtained by reducing the object 131.

In this case, as a result of a search based on the degree of similarity calculated from the detection result of the characteristic points of the captured image 40A, there is a possibility that the image 130B, not the image 130A, is searched for. In this case, the user cannot obtain desired cooperative information. In order to prevent such a situation, the searching unit 103 in the embodiment searches for an image stored in the DB 12 based on the size ratio between an object area (image capture range) and an object.

More detailed description will be given using FIGS. 2(*a*) and 2(*b*). In the image 130A exemplified in FIG. 2(*a*), the object 131 is placed so that it occupies larger space with respect to the image 130A, and the object area 134 is set with respect to the object 131 in a slightly larger size than the object 131. In the image 130B exemplified in FIG. 2(*b*), the object 132 obtained by reducing the object 131 is placed, and the object area 135 is set with respect to the entire image 130B, that is, in a sufficiently larger size with respect to the size of the object 132.

In the image 130A, it is assumed that a first ratio of the size of the object 131 with respect to the size of the object area 134 is ½, for example, as a value obtained based on the areas of the two. In the image 130B, the value of a second ratio of the size of the object 132 with respect to the size of the object area 135 determined on the basis of the areas is, for example, 1/16, which is different from the case of image 130A to a large extent. The size ratio is not limited to the method of determining it based on the areas. Such information indicating the size ratio may be determined in advance and stored in the DB 12 being included in an index.

For the captured image 40A received from the terminal unit 20, the ratio between the size of the object extracted by the extracting unit 101 and the size of the captured image 40A itself may be determined. For example, it is assumed that the captured image 40A is an image indicated by the image 130A shown in FIG. 2(*a*) and that a third ratio of the size of the object (assumed to be the object 131) with respect to the size of the captured image 40A is, for example, ¼.

In this case, the third ratio is closer to the first ratio than to the second ratio. The searching unit 103 accordingly outputs an index corresponding to the image 130A as a search result for the captured image 40A. The presenting unit 104 presents cooperative information associated with the index according to this image 130A to the terminal unit 20. The index is thus selected based on the ratio of the size of the object with respect to the image size, allowing a desired index to be selected more accurately.

Figure 4:
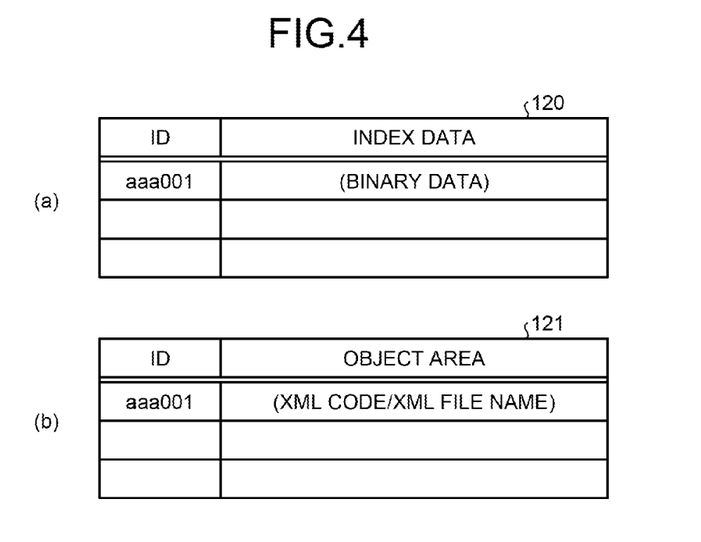
FIGS. 4(a) and 4(b) are diagrams illustrating exemplary configurations of a DB according to the embodiment.

FIGS. 4(*a*) and 4(*b*) illustrate an exemplary configuration of the DB 12 for achieving this processing of searching for an image based on the size ratio of an object. FIG. 4(*a*) illustrates an example of an index table 120 for identifying each piece of index data stored in the DB 12. As exemplified in FIG. 4(*a*), each piece of index data is stored in the DB 12 with an ID and the binary data of the index data associated with each other.

The format of the ID is not in particular limited, as long as each piece of index data stored in the DB 12 can be identified. When each piece of index data stored in the DB 12 is for searching for an object on a page of the catalog magazine, any value including the number of a page on which the object is shown may be used as the ID.

FIG. 4(*b*) illustrates an example of an object area table 121 that associates the ID and object area of an image. In this example, the object area is written in the Extensible Markup Language (XML), which is one of the markup languages that defines and describes the meaning and structure of data using tags. As will be described later, the description of cooperative information is also embedded into this description of the object area. An XML code in which an object area is described may be stored directly in a field of the object area table 121, or may be described in a file separately with its file name and path written in the field.

Figure 5:
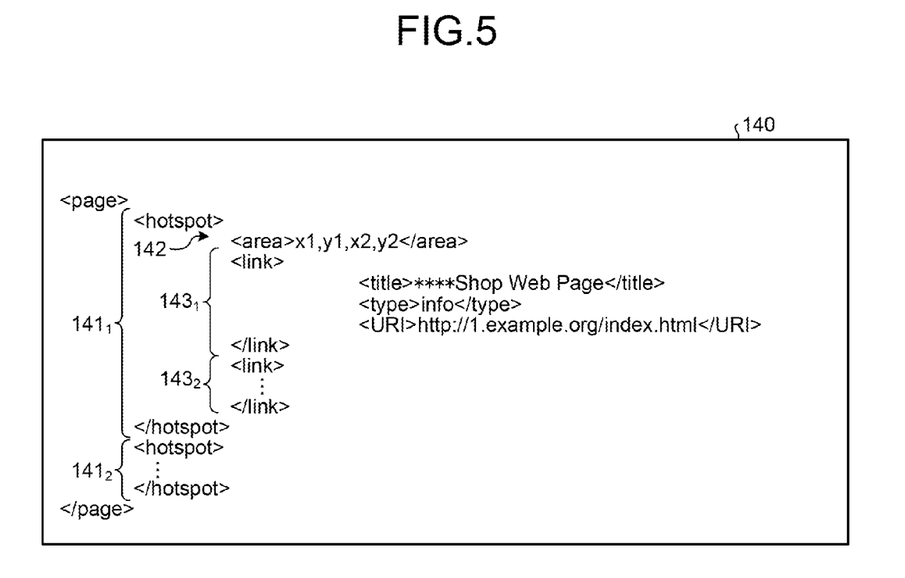
FIG. 5 is a diagram illustrating an exemplary XML code according to the embodiment.

FIG. 5 illustrates an example of an XML code 140 illustrated in FIG. 4(*b*). The XML code 140 illustrated in FIG. 5 is an example of describing an object area of a contents page of the catalog magazine. The page is defined by the outermost tags "" and "." In each of parts 141$_1$ and 141$_2$, one object area is defined by the tags "<hotspot>" and "</hotspot>." A plurality of object areas can be thus defined for one page.

In the part 141$_1$, the first line 142 defines the range of an image with, for example, the top-left corner coordinates (x1, y1) and the bottom-right corner coordinates (x2, y2) by the tags "<area>" and "</area>."

In respective parts 143$_1$ and 143$_2$, each one piece of cooperative information is defined by the tags "<link>" and "</link>." A plurality of pieces of cooperative information can be thus defined for one object area. In the part 143$_1$, the title of the cooperative information is defined by the tags "<title>" and "</title>." The type of the cooperative information is defined by the tags "<type>" and "</type>." In this example, as a piece of cooperative information, address information on the network 10 is defined by the tags "<URI>" and "</URI>."

The object area in the page and the cooperative information in the object area are thus defined by the XML code 140, thereby executing functions of the cooperative information associated with the object included in the object area in the page.

Figure 6:
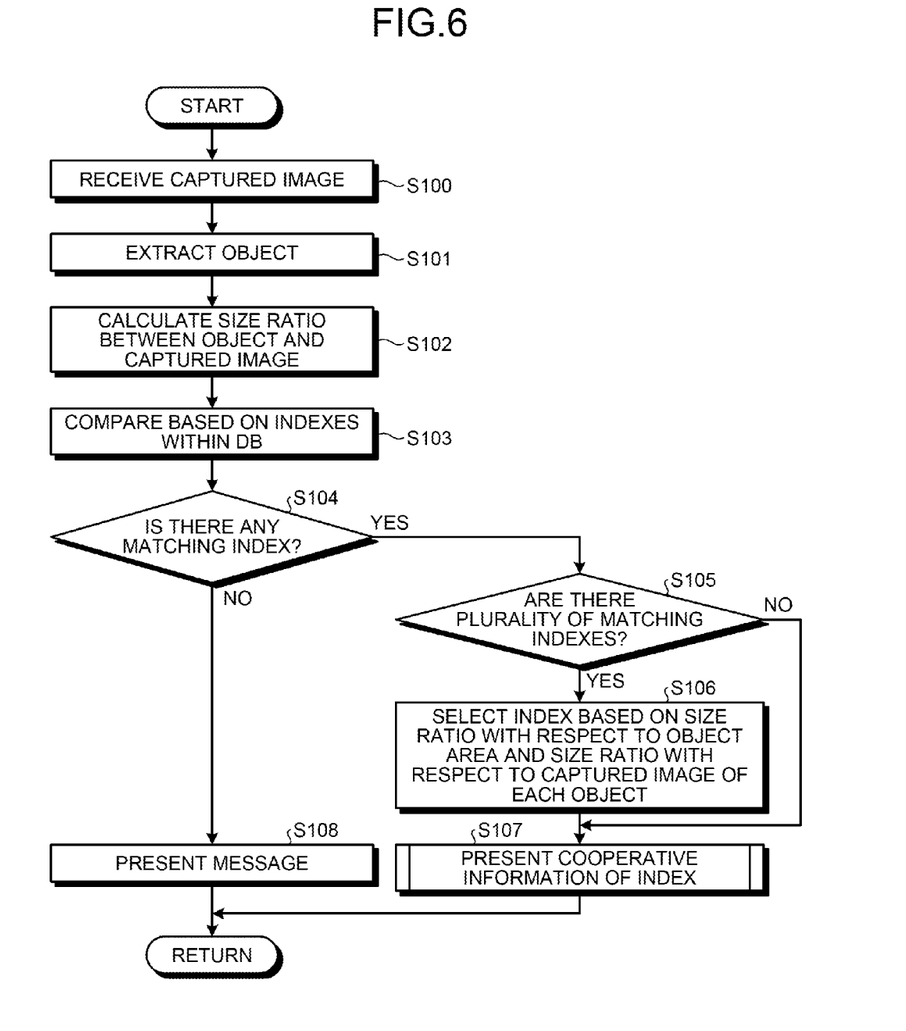
FIG. 6 is a flowchart illustrating an example of the operation of the server according to the embodiment.

FIG. 6 is a flowchart illustrating an example of the operations of the server 11 of the embodiment. First, for example, the captured image 40A captured by the terminal unit 20 is transmitted to the server 11 through the network 10. At Step S100, in the server 11, the receiving unit 100 receives the captured image 40A. At the following Step S101, the extracting unit 101 performs image analysis on the received captured image 40A to detect characteristic points and extract an object.

At the following step S102, the searching unit 103 calculates the ratio of the size of the object with respect to the size of the captured image 40A. For each image stored in the DB 12, the ratio of the size of the object with respect to the object area is assumed to be calculated in advance. Information indicating the ratio of each image stored in the DB 12 can be embedded into the above XML code 140.

At the following step S103, the calculating unit 102 compares the object extracted from the captured image 40A with the objects searched for by the indexes stored in the DB 12. More specifically, the calculating unit 102 calculates respective degrees of similarity between the object included in the captured image and the objects searched for by the respective indexes stored in the DB 12.

At the following Step S104, based on the degrees of similarity calculated at Step S103, the searching unit 103 determines whether there is any index by which an object that matches the object included in the captured image 40A is searched for among the indexes stored in the DB 12. In this example, an object whose degree of similarity is not less than a threshold among the objects searched for by the indexes included in the DB 12 is determined to be an index by which the object that matches the object included in the captured image 40A is searched for.

If it is determined that there is an index by which the objects match at Step S104, the searching unit 103 then proceeds to Step S105. At Step S105, the searching unit 103 determines whether the objects match on a plurality of indexes among the indexes stored in the DB 12. If it is determined that the objects match on only one index, the searching unit 103 gives the one index as a search output and then proceeds to Step S107, which will be described later. If it is determined that the objects match on a plurality of indexes, the searching unit 103 then proceeds to Step S106.

At Step S106, the searching unit 103 determines the ratios of the sizes of the objects searched for by the indexes with respect to the size of the objects area. These ratios for the objects may be determined in advance and stored in the DB 12. The searching unit 103 also determines the ratio of the size of the object with respect to the size of the captured image 40A. The closest ratio to the ratio determined for the captured image 40A is determined from among the ratios determined for the objects. The searching unit 103 then selects an index for searching for the object corresponding to the determined ratio as a search output, and proceeds to Step S107.

At Step S107, the presenting unit 104 retrieves the cooperative information associated with the index of the search output by the searching unit 103 from the DB 12. The presenting unit 104 then performs presentation of the retrieved cooperative information to the terminal unit 20 as the source of the captured image 40A. Then, a series of processing in the flowchart of FIG. 6 is ended.

If it is determined that there is no matching index at Step S104, the process proceeds to Step S108 where the presenting unit 104 presents a message indicating the fact that no matching index is stored in the DB 12 to the terminal unit 20. Then, a series of processing in the flowchart of FIG. 6 is ended.

Figure 7:
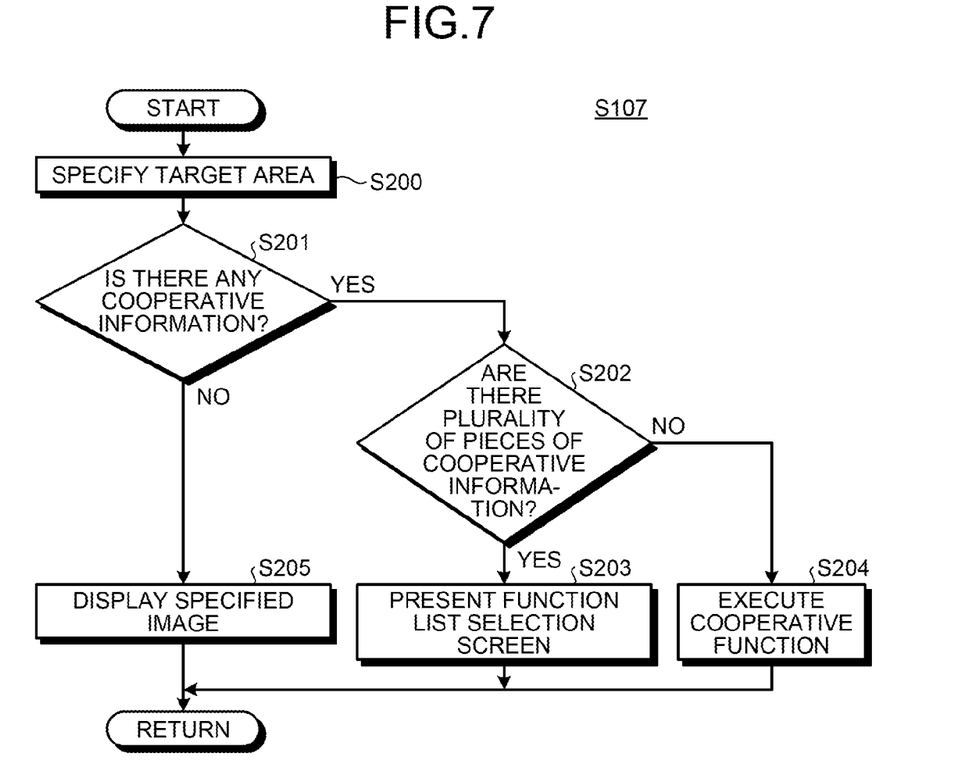
FIG. 7 is a flowchart illustrating an example of the presentation processing of the cooperative information of an index according to the embodiment.

FIG. 7 is a flowchart illustrating an example of the presentation processing of the cooperative information of the index at Step S107 in FIG. 6. First at Step S200, the presenting unit 104 specifies an object area corresponding to the captured image 40A in the object searched for by the index that is the search output of the searching unit 103. At the following Step S201, the presenting unit 104 refers to the DB 12 to determine whether there is cooperative information associated with the specified object area. If it is determined that there is the cooperative information, the presenting unit 104 then proceeds to Step S202 to determine whether a plurality of pieces of cooperative information are associated with the object area.

If the presenting unit 104 determines that a plurality of pieces of cooperative information are associated with the object area at Step S202, it then proceeds to Step S203. At Step S203, the presenting unit 104 generates a function list indicating functions of these pieces of cooperative information and presents a selection screen for selecting one function from the function list to the terminal unit 20. For example, when a URL and telephone number as cooperative information are associated with a specified target area, a selection screen for selecting a function of accessing the address indicated by the URL and a telephone function to the telephone number is generated and presented to the terminal unit 20. Then, a series of processing in the flowchart of FIG. 7 is ended.

If the presenting unit 104 determines that only one piece of cooperative information is associated with the object area at Step S202, it then proceeds to Step S204. At Step S204, a screen for executing the function of the one piece of cooperative information is generated and presented to the terminal unit 20. Then, a series of processing in the flowchart of FIG. 7 is ended.

If it is determined at Step S201 that no cooperative information is associated with the object area specified at Step S200, the process proceeds to Step S205. At Step S205, the presenting unit 104 presents a preset screen to the terminal unit 20. Then, a series of processing in the flowchart of FIG. 7 is ended.

Although in the above description one index is selected from the indexes at the server 11 side at Step S106, the present invention is not limited to this example. In other words, a user may be prompted to perform the processing of selecting one index from the indexes.

Figure 8:
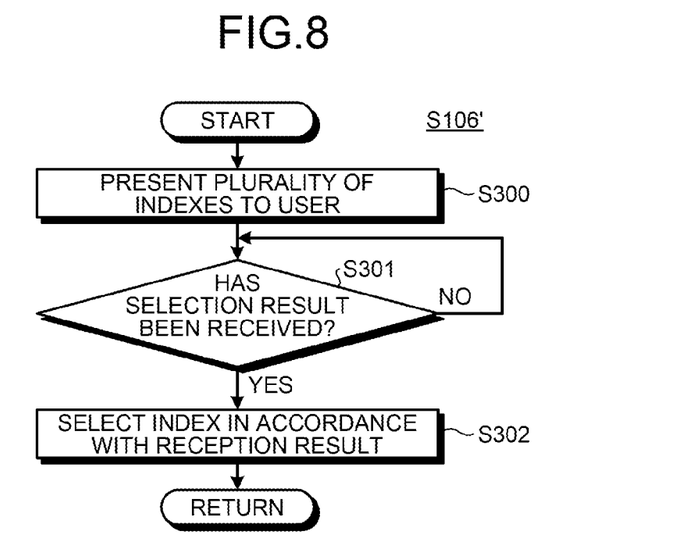
FIG. 8 is a flowchart illustrating exemplary processing when prompting a user to perform processing for selecting one index from among a plurality of indexes according to the embodiment.

FIG. 8 is a flowchart illustrating an exemplary process when prompting a user to perform the processing of selecting one index from a plurality of indexes of the search output of the searching unit 103. If it is determined that matching with the object included in the captured image 40A occurs on the indexes at Step S105 of FIG. 6, the searching unit 103 then proceeds to Step S106' illustrated in FIG. 8.

After the process proceeds to Step S106', the presenting unit 104 generates a screen for presenting information indicating the indexes determined to match to the user and presents it to the terminal unit 20 at Step S300. For example, the presenting unit 104 may generate a screen for displaying the images of the objects searched for by the indexes and present it to the terminal unit 20.

The presenting unit 104 waits for the reception of a selection result of selecting one index (object image) from among the indexes (object images) from the terminal unit 20 (Step S301). Upon receiving the selection of one index from the indexes presented at Step S300 from the terminal unit 20, the presenting unit 104 selects one object from among the object images for which the indexes are determined to match in accordance with the reception result at Step S302. The cooperative information associated with the index by which the selected object is searched for is then retrieved from the DB 12 and presented to the terminal unit 20.

In this way, presenting the images to the user enables the user to select a desired image more accurately.

Figure 9:
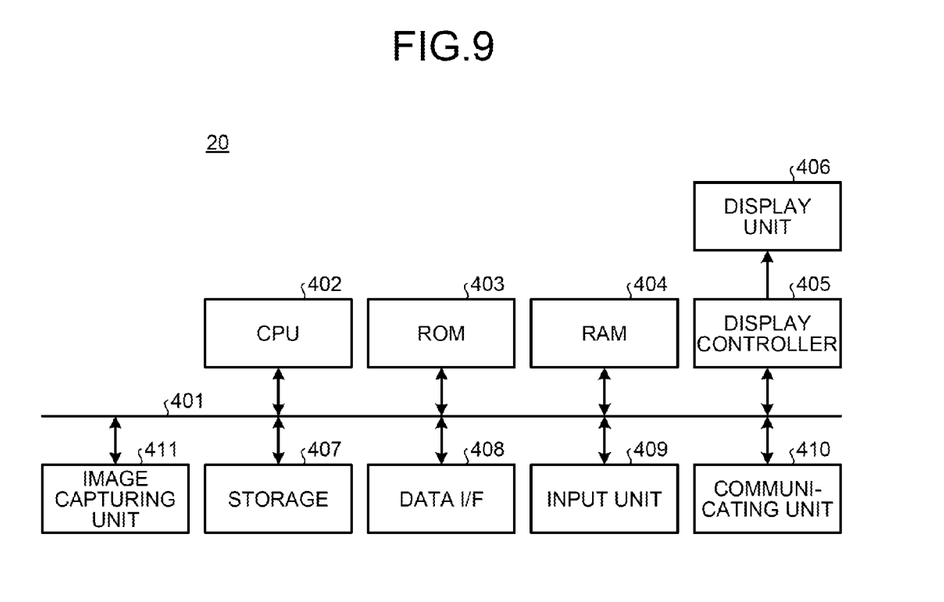
FIG. 9 is a block diagram illustrating an exemplary configuration of a terminal unit according to the embodiment.

FIG. 9 illustrates an exemplary configuration of the terminal unit 20. In the terminal unit 20 exemplified in FIG. 9, a bus 401 connects a CPU 402, a ROM 403, a RAM 404, and a display controller 405. The bus 401 also connects a storage 407, a data I/F 408, an input unit 409, a communicating unit 410, and an image capturing unit 411. The storage 407 is a storage medium that can store therein data in a nonvolatile manner and is a nonvolatile semiconductor memory such as a flash memory. Without being limited thereto, a hard disk drive may be used as the storage 407.

The CPU 402 controls the entire computer 400 according to a computer program stored in the ROM 403 and the storage 407 using the RAM 404 as a working memory. The display controller 405 converts a display control signal generated by the CPU 402 into a signal that can be displayed by a display unit 406 and outputs it.

The storage 407 stores therein the above program to be executed by the CPU 402 and various types of data. The data I/F 408 performs the inputting of external data. As the data I/F 408, an interface based on the universal serial bus (USB), the Institute of Electrical and Electronics Engineers 1394 (IEEE1394), or the like may be applicable.

The input unit 409 includes an input device for receiving user input. The user operates the input device in accordance with, for example, display on the display unit 406, thereby giving instructions to the terminal unit 20. It is preferable that the input device for receiving user input is integrated with the display unit 406 to be constructed as a touch panel that outputs a control signal in accordance with a pressed position and allows an image on the display unit 406 to be transmitted.

The communicating unit 410 performs communications with the network 10 using a predetermined protocol. The image capturing unit 411 includes an optical system, an image capturing element, and a control drive circuit for the optical system and the image capturing element. The image capturing unit 411 performs predetermined processing on signals output from the image capturing element to be output as image data. The image capturing unit 411 performs the functions of image capture, zooming, or the like in accordance with instructions through user operations on the input unit 409. A captured image captured and obtained by the image capturing unit 411 is sent to the communicating unit 410 through the bus 401, and transmitted to the server 11 through the network 10 in accordance with an instruction of the CPU 402, for example.

In the foregoing configuration, the terminal unit 20 can display information presented by the presenting unit 104 of the above server 11 using a browser application for browsing web sites on the network 10. The terminal unit 20 can transmit requests and data to the server 11 using the browser application.

In this case, in the server 11, the presenting unit 104 generates display control information for presenting information to the terminal unit 20 using the HyperText Markup Language (HTML) and various script languages, and places the generated file on a predetermined address on the network 10. The terminal unit 20 is informed of the address from the presenting unit 104, and thus can access the display control information and display the presentation of information with the presenting unit 104.

Figure 10:
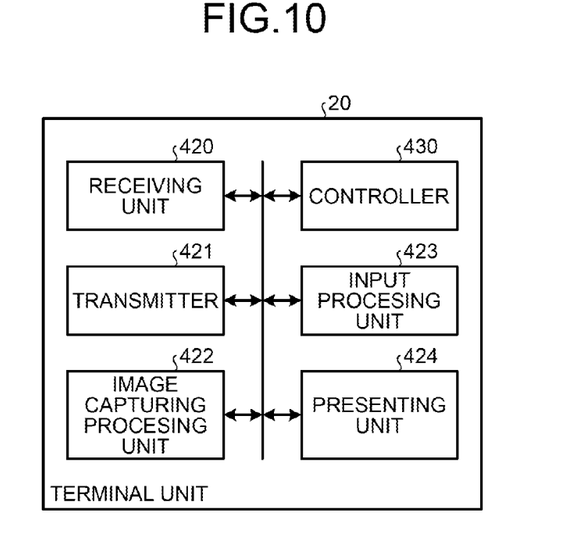
FIG. 10 is a functional block diagram illustrating exemplary functions of the terminal unit according to the embodiment.

Without being limited thereto, the terminal unit 20 may be installed with an application that performs a series of processing ranging from the transmission of the captured image to the display of the presented information. FIG. 10 is a functional block diagram illustrating exemplary functions of the terminal unit 20 in this case. The terminal unit 20 includes a receiving unit 420, a transmitter 421, an image capturing processing unit 422, an input processing unit 423, a presenting unit 424, and a controller 430.

The image capturing processing unit 422 controls the image capturing operation by the image capturing unit 411 and acquire a captured image. The transmitter 421 has address information on the network 10 of the server 11 in advance, for example, and performs transmission processing to the server 11 through the network 10. The transmitter 421 transmits the captured image acquired by the image capturing processing unit 422 to the server 11. The receiving unit 420 receives the information transmitted from the server 11. For example, the receiving unit 420 receives the information presented by the presenting unit 104 of the server 11.

The input processing unit 423 processes user input to the input unit 409 as hardware. The presenting unit 424 passes a UI image prepared in advance to the display controller 405 and allows the display unit 406 to display a screen of this UI image. The presenting unit 424 generates a display screen based on, for example, the information presented by the presenting unit 424 of the server 11 and received by the receiving unit 420, and allows the display unit 406 to display it through the display controller 405. The information presentation by the presenting unit 424 may also be performed by voice instead of display.

The controller 430 controls the entire operation of the terminal unit 20. The controller 430 can execute cooperative functions based on the cooperative information corresponding to the captured image presented by the presenting unit 104 of the server 11. For example, when a URL is designated as the cooperative information, the controller 430 may call the browser application installed in the terminal unit 20 to access the address indicated by this URL.

The above receiving unit 420, transmitter 421, image capturing processing unit 422, input processing unit 423, presenting unit 424, and controller 430 are achieved by a terminal-oriented program that operates on the CPU 402. This terminal-oriented program is stored in a computer connected to the network 10 and is provided by being downloaded through the network 10. The terminal-oriented program may be provided or distributed through the network 10. The terminal-oriented program may be stored in advance and provided in the ROM 403.

Without being limited thereto, the terminal-oriented program may be recorded in a computer-readable storage medium such as a CD or a DVD as a file in an installable or executable format. In this case, the terminal-oriented program may be provided to the terminal unit 20 through an external drive device connected to the data I/F 408.

The terminal-oriented program has a modular configuration including the above units (the receiving unit 420, the transmitter 421, the image capturing processing unit 422, the input processing unit 423, the presenting unit 424, and the controller 430), and as actual hardware, the CPU 402 reads the terminal-oriented program from, for example, the storage 407 and executes it, thereby loading and generating the above units into a main storage (for example, the RAM 404).

The present invention provides the effect of attaining a more appropriate search result by an image-based search.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A searching apparatus comprising:
   a memory configured to store therein one or more image data of which each includes respectively one or more cooperative object, and one or more pieces of cooperative information associated with one cooperative object; and
   a processor configured to,
   receive a captured image including a captured object that is a capturing target of a user,
   search for, out of the image data, an image data that includes the same object as the captured object included in the received captured image,
   determine, when a plurality of image data that includes the same object as the captured object have been searched for, a priority among a plurality of the searched image data based on a first ratio of a size of the captured object with respect to a size of the received captured image,
   present the cooperative information associated with the cooperative object included in at least one of the plurality of the searched image data that includes the same object as the captured object based on the determined priority,
extract the captured object from the received captured image,
determine the first ratio based on the size of extracted captured object and the received captured image, and
determine the priority among the plurality of the searched image data based on a relation between the first ratio and a second ratio of a size of the same object included in one of the plurality of the searched image data with respect to a size of the one of the plurality of the searched image data.

2. The searching apparatus according to claim 1, wherein the processor is configured to present, when a plurality of image data that include the same object as the captured object have been searched for, a message that prompts the selection of one image data out of the plurality of the searched image data to the source of the captured image.

3. The searching apparatus according to claim 1, wherein the memory is further configured to store therein index data obtained by analyzing the image data, and
the processor is further configured to,
calculate a degree of similarity between the image data and the captured image data based on feature data obtained by analyzing the captured image data and the index data, and
search the image data based on the calculated degree of similarity.

4. The searching apparatus according to claim 1, wherein the processor is further configured to,
present, when one piece of cooperative information is associated with the same object included in one of the searched image data being the highest priority, the one piece of cooperative information by executing a function indicated by the one piece of cooperative information, and
present, when a plurality of pieces of cooperative information are associated with the same object included in the one of the searched image data being the highest priority, the plurality of pieces of cooperative information by displaying a selection screen that prompts the selection of one piece of cooperative information from the plurality of pieces of cooperative information to the source of the captured image.

5. The searching apparatus according to claim 1, wherein the cooperative information is configured to include at least URL and telephone number, and
the processor is configured to present, when the searched image data includes a plurality of the cooperative objects, the plurality of pieces of the cooperative information of which each is associated with any one of the plurality of the cooperative objects.

6. The searching apparatus according to claim 1, wherein the cooperative information is information that includes an access method for accessing an attribute information of the cooperative object.

7. A searching method comprising:
storing one or more image data of which each includes respectively one or more cooperative object, and one or more pieces of cooperative information associated with one cooperative object;
receiving a captured image including a captured object that is a capturing target of a user;
searching, out of the image data, an image data that includes the same object as the captured object included in the received captured image;
determining, when a plurality of image data that includes the same object as the captured object have been searched for, a priority among a plurality of the searched image data based on a first ratio of a size of the captured object with respect to a size of the received captured image;
presenting the cooperative information associated with the cooperative object included in at least one of the plurality of the searched image data that includes the same object as the captured object based on the determined priority;
extracting the captured object from the received captured image;
determining the first ratio based on the size of extracted captured object and the received captures image; and
determining the priority among the plurality of the searched image data based on a relation between the first ratio and a second ratio of a size of the same object included in one of the plurality of the searched image data with respect to a size of the one of the plurality of the searched image data.

8. The searching method according to claim 7, further comprising:
presenting a message that prompts the selection of one image data out of the plurality of the searched image data to the source of the captured image when a plurality of image data that include the same object as the captured object have been searched for.

9. The searching method according to claim 7, further comprising:
calculating a degree of similarity between the image data and the captured image data based on feature data obtained by analyzing the captured image data and the index data;
storing therein index data obtained by analyzing the image data; and
searching the image data based on the calculated degree of similarity.

10. The searching method according to claim 7, further comprising:
presenting a function indicated by the one piece of cooperative information when one piece of cooperative information is associated with the same object included in one of the searched image data being the highest priority; and
presenting the plurality of pieces of cooperative information by displaying a selection screen that prompts the selection of one piece of cooperative information from the plurality of pieces of cooperative information to the source of the captured image when a plurality of pieces of cooperative information are associated with the same object included in the one of the searched image data being the highest priority.

11. The searching method according to claim 7, further comprising:
presenting, when the searched image data includes a plurality of the cooperative objects, the plurality of pieces of the cooperative information of which each is associated with any one of the plurality of the cooperative objects, wherein
the cooperative information is configured to include at least URL and telephone number.

12. An information presenting system, comprising:
a searching system;
a terminal;
at least one memory configured to store therein one or more image data of which each includes respectively one or more cooperative object, and one or more pieces of cooperative information associated with one cooperative object; and at least one processor configured to:
- send, from the terminal to the searching system, a search request based on an image captured by the terminal, the captured image including a captured object that is a capturing target of a user,
- search for, out of the image data, an image data that includes the same object as the captured object included in the received captured image,
- determine, when a plurality of image data that includes the same object as the captured object have been searched for, priority among a plurality of the searched image data based on a first ratio of a size of the captured object with respect to a size of the received captured image,
- send, from the searching system to the terminal, the cooperative information associated with the cooperative object included in at least one of the plurality of the searched image data that includes the same object as the captured object,
- present, to the user, the cooperative information sent from the searching system based on the determined priority,
- extract the captured object from the received captured image,
- determine the first ratio based on the size of extracted captured object and the received captures image, and
- determine the priority among the plurality of the searched image data based on a relation between the first ratio and a second ratio of a size of the same object included in one of the plurality of the searched image data with respect to a size of the one of the plurality of the searched image data.

13. The information presenting system according to claim 12, wherein the at least one processor is configured to present, when a plurality of image data that include the same object as the captured object have been searched for, a message that prompts the selection of one image data out of the plurality of the searched image data to the source of the captured image.

14. The information presenting system according to claim 12, wherein
the at least one memory is further configured to store therein index data obtained by analyzing the image data, and
the at least one processor is further configured to,
calculate a degree of similarity between the image data and the captured image data based on feature data obtained by analyzing the captured image data and the index data, and
search the image data based on the calculated degree of similarity.

15. The information presenting system according to claim 12, wherein the at least one processor is configured to,
present, when one piece of cooperative information is associated with the same object included in one of the searched image data being the highest priority, the one piece of cooperative information by executing a function indicated by the one piece of cooperative information, and
present, when a plurality of pieces of cooperative information are associated with the same object included in the one of the searched image data being the highest priority, the plurality of pieces of cooperative information by displaying a selection screen that prompts the selection of one piece of cooperative information from the plurality of pieces of cooperative information to the source of the captured image.

16. The information presenting system according to claim 12, wherein
the cooperative information is configured to include at least URL and telephone number, and
the at least one processor is configured to present, when the searched image data includes a plurality of the cooperative objects, the plurality of pieces of the cooperative information of which each is associated with any one of the plurality of the cooperative objects.

* * * * *